United States Patent
Wallace

[15] 3,656,833
[45] Apr. 18, 1972

[54] COMBINED PLASTIC-GLASS MICROSCOPE SLIDES

[72] Inventor: Clarence Wallace, Glendale, Calif.
[73] Assignee: Medical Plastics, Inc., Burbank, Calif.
[22] Filed: June 29, 1970
[21] Appl. No.: 50,596

[52] U.S. Cl.............................................350/95, 356/244
[51] Int. Cl......................................................G02b 21/34
[58] Field of Search.............................................350/92–95; 356/244–246

[56] References Cited

UNITED STATES PATENTS

| | | | |
|---|---|---|---|
| 2,090,914 | 8/1937 | Porter | 350/95 |
| 3,551,023 | 12/1970 | Brackett | 350/95 |
| 3,432,275 | 3/1969 | Unger | 350/95 X |

Primary Examiner—David Schonberg
Assistant Examiner—Toby H. Kusmer
Attorney—Angus and Mon

[57] ABSTRACT

A microscope slide according to the present disclosure is provided for laboratory use. Its utility is widespread, a single example being in lymphocyte typing. The slide comprises a body constructed of a non-wettable material having aperture means extending between opposite planar surfaces. A glass plate is bonded to one of the planar surfaces so as to close one end of the aperture means and thereby to form cavity means for confining a specimen to a restricted area. The glass plate provides a wettable surface in the cavity means for the specimen so that the specimen may spread on the glass plate in the cavity means. The device thereby provides the manufacturing convenience of a plastic-molded product with the essential feature of a wettable glass slide.

7 Claims, 6 Drawing Figures

PATENTED APR 18 1972

3,656,833

INVENTOR.
CLARENCE WALLACE
BY Angus & Mau
ATTORNEYS.

COMBINED PLASTIC-GLASS MICROSCOPE SLIDES

This invention relates to microscope slides.

Heretofore, slides for various types of medical tests, especially those in which numerous cavities must be provided for comparison purposes (lymphocyte typing being a single example), have not been satisfactory because such slides have been constructed of plastic material which was not capable of being wetted by the sample. To make plural (or even single) cavities in glass in prohibitively expensive, and plastic cavities would not permit the sample to be smeared across a surface of a slide. Instead, the sample beaded up on the slide. In an effort to use plastic slides, such extremes have been attempted as to use tapered cavities, and requiring the technician to poke the sample into the bottom with a toothpick. The preparation of samples for test purposes on such slides was time consuming and resulted in increased expenses for such tests.

It is an object of the present invention to provide an inexpensive slide for use in lymphocyte typing wherein the sample may readily be smeared across a glass surface, while reducing the cost of the cavities by using a plastic sheet to provide them.

Another object of the present invention is to provide a laboratory slide having a plurality of cavities for test purposes wherein samples to be tested may be smeared across a planar glass surface in each cavity.

Another object of the present invention is to reduce the time required for making up test slides by providing slides with a surface upon which samples may readily be smeared.

A slide according to the present invention comprises a non-toxic molded plastic body having a cavity formed therein. Non-wettability is no concern as to this body. A glass plate is bonded to one surface of the slide so as to close the lower end of the cavity. A sample placed in the cavity spreads on the glass plate, because the glass can be wetted by it.

According to a preferred but optional feature of this invention, a plurality of said cavities is formed by the plastic body, and only a single piece of glass is used.

In accordance with another preferred but optional feature of the present invention, the upper surface of the slide includes a recessed portion formed by a rim, in fluid communication with the cavities so that the slide may be flooded with an encapsulating fluid for encapsulating the sample.

The above and other features of this invention will be fully understood from the following detailed description and the accompanying drawings, in which.

Figure 1:
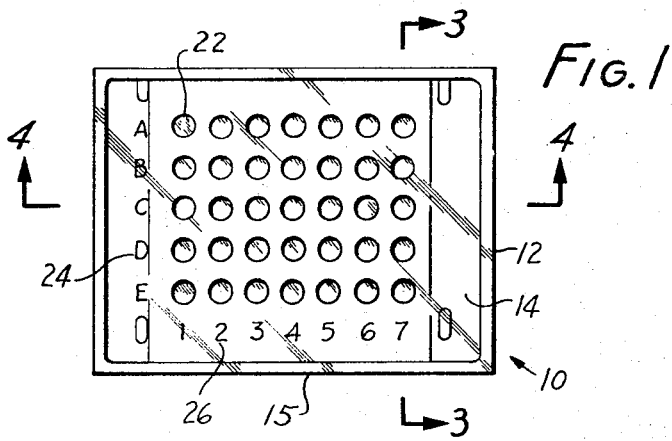
FIG. 1 is a plan view of a slide in accordance with the presently preferred embodiment of the invention.
Figure 5:
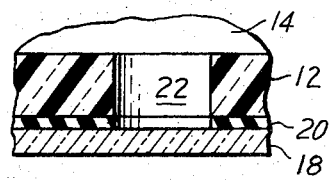
Figure 2:
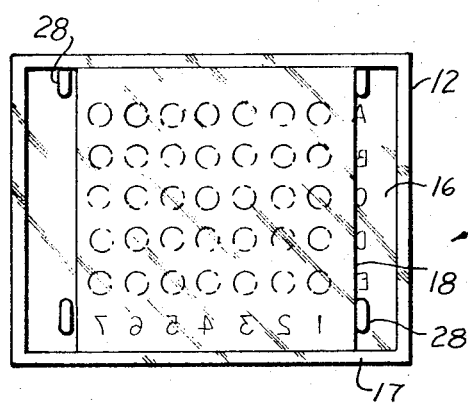
FIG. 2 is a bottom view of the slide illustrated in FIG. 1.
Figure 3:
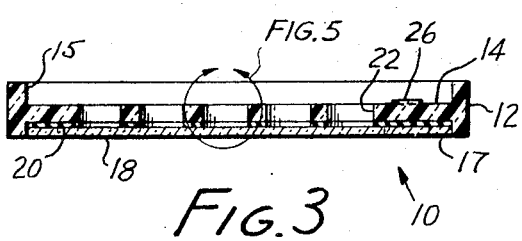
Figure 4:
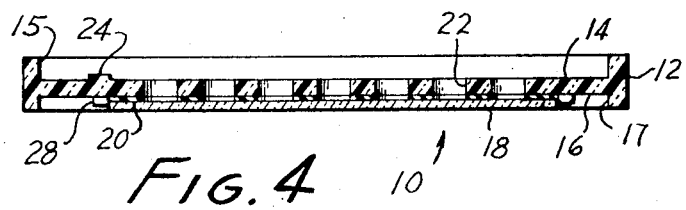

FIGS. 3 and 4 are section views taken at lines 3—3 and 4—4, respectively, in FIGS. 1;

FIG. 5 is a section view taken at circle 5—5 in FIG. 3; and

Figure 6:
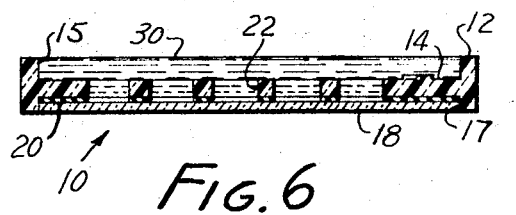

FIG. 6 is a section view of the slide as in FIG. 3 showing the manner in which the slide is used.

Referring to the drawings, there is illustrated a slide 10 comprising a molded plastic body 12, preferably constructed of moldable transparent non-porous, non-toxic styrene. Styrene, like other plastic materials, is not wettable by blood or other samples intended to be tested with a slide of this class. The styrene is not toxic either to the intended sample, serum, or other substance normally placed in contact with the material in use. Other moldable plastics with similar properties may be used instead.

Body 12 includes a upper recessed portion 14 bounded by rim 15 and a lower recessed portion 16 bounded by rim 17. Portion 16 receives glass plate 18 which is bonded to body 12 by means of suitable epoxy resin 20, which is non-toxic to the sample in the same sense as the styrene. Other bonding agents with similar properties may be used instead.

Apertures 22 are formed through body 12 so that plate 18 closes one end of apertures 22 to form a plurality of individual cavities in fluid communication with recess 14. Preferably, indicia 24 and 26 are provided in recess 14 for identifying the cavities 22. By way of example, cavities 22 may be positioned in a matrix of rows and columns, each row being indicated by a numeral and each column by a letter. Hence, the individual cavities 22 may be designated by a letter and number combination indicative of the row and column in which the particular cavity is located. It is evident, however, that this invention comprehends the use of only one cavity, as well as a plurality of them.

As shown particularly in FIG. 5, glass plate 18 is bonded to body 12 in such a manner that the bonding material does not enter the region within cavities 22.

To aid in the manufacture of the device, locating knobs or studs 28 may be provided on the planar surface of recess 16 for accurately positioning glass plate 18 during the manufacture of the slide. Also, and as illustrated in FIGS. 3 and 4, the thickness of glass plate 18 relative to the rim is preferably chosen so that the lower surface of the plate is substantially flush with the lower surface of body 12 when the plate is disposed within recess 16.

The slide is manufactured by placing epoxy resin on body 12 within recess 16 and thereafter positioning glass plate 18 in recess 16 against the planar surface thereof, covering apertures 22 to close the individual cavities. Glass plate 18 is accurately positioned by means of studs 28. After the resin has cured, the slide is ready for use.

In the use of the slide, specimens may be placed on the glass plate in one or more cavities 22. Since the lower surface of each cavity 22 is formed by a planar surface of glass plate 18, and since glass can be wetted by the specimen, each specimen smears over the glass plate in the individual cavity so that the specimens may be examined. Thereafter, if called for by the respective procedure, encapsulating oil 30 may be placed in recess 14 and over the specimens in individual cavities 22 to encapsulate the specimens for examination purposes. The oil may thereafter be frozen so that specimens are encapsulated between glass slide 18 and the frozen oil 30. The particular oil used for such purposes is well known in the art and need not be further described. The specimens may thereafter be examined with the aid of a microscope in a manner well known in the art.

The present invention thus provides an examination slide wherein a plurality of examining cavities are provided for examining specimens. The apparatus is inexpensive to manufacture inasmuch as the body is constructed of plastic, and yet the slide provides a wetting surface of glass upon which the sample may be smeared for examination purposes. The slide is relatively inexpensive and may be discarded after use rather than be cleaned. Alternatively, its construction is amenable to cleaning, which is not true of many of the prior art devices.

This invention is not to be limited by the embodiment shown in the drawings and described in the description, which is given by way of example and not of limitation, but only in accordance with the scope of the appended claims.

What is claimed is:

1. A microscope slide for supporting a specimen comprising a body constructed of a molded non-wettable plastic material, said body having aperture means disposed between opposite planar surfaces, and a glass plate attached to said body adjacent one of said planar surfaces to close one end of said aperture means to form cavity means, said glass plate providing a wettable surface at the bottom of said cavity means.

2. A microscope slide according to claim 1 further including non-toxic bonding means attaching said glass plate to said one planar surface of said body.

3. A microscope slide according to claim 1 further including recess means in said body in the planar surface opposite said one planar surface.

4. A microscope slide according to claim 1 wherein said aperture means comprises a plurality of apertures and said cavity means is a plurality of cavities, said cavities being arranged in rows and columns.

5. A microscope slide according to claim 1 further including rim means forming a recess in said body in the planar surface opposite said one surface and in fluid communication with each of said plurality of cavities, said recess being adapted to contain fluid to a depth sufficient to cover said cavities and the planar surface on the opposite side from the glass plate.

6. A microscope slide for supporting a specimen comprising a substantially rectangular body constructed of molded styrene which is not wettable by liquid, and which is not toxic to an intended specimen, a first rim bounding one substantially rectangular planar surface of said body and a second rim bounding the opposite substantially rectangular planar surface of said body; a plurality of apertures between said first and second planar surface, said apertures being arranged in rows and columns on the planar surfaces; a glass plate on said first surface; and an epoxy bonding said glass plate to said body on said first surface, said glass plate closing one end of each of said apertures to form a plurality of cavities open to said second surface, said glass plate being constructed of a material which is wettable by the specimen, said epoxy being of the class which is non-toxic to the specimen, said second rim being adapted to contain fluid to a depth sufficient to cover said cavities and said second planar surface.

7. Apparatus according to claim 6 wherein the thickness of the glass plate is substantially equal to the height of said first rim from said first planar surface.

* * * * *